May 12, 1931.  C. E. STARR  1,804,894
BRAKE MECHANISM
Filed April 7, 1926
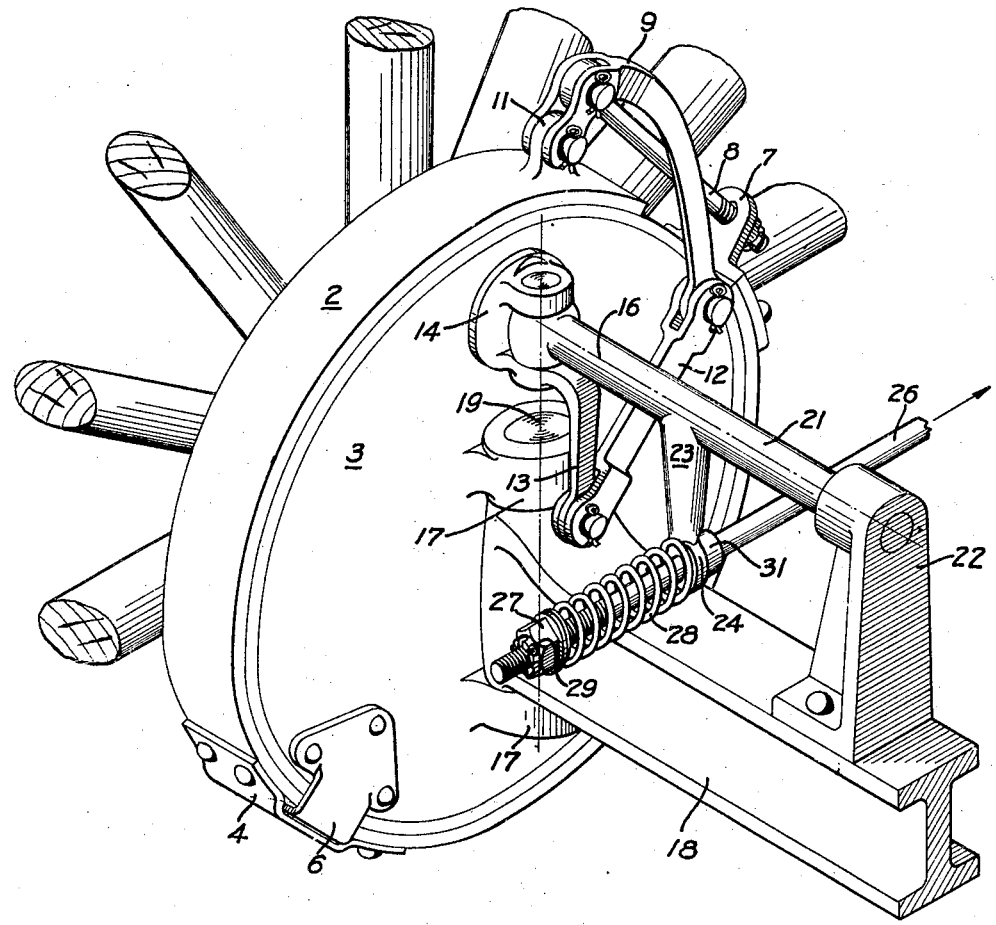
INVENTOR
Charles E. Starr
By Charles S. Evans
His Attorney.

Patented May 12, 1931

1,804,894

UNITED STATES PATENT OFFICE

CHARLES E. STARR, OF LOS ANGELES, CALIFORNIA

BRAKE MECHANISM

Application filed April 7, 1926. Serial No. 100,285.

My invention relates to brake mechanisms and particularly to that of four-wheel brakes. One of the objects of the invention is the provision of means for preventing the locking of the wheels when the brakes are applied.

My invention possesses other objects and features of advantage some of which with the foregoing will be set forth in the following description of my invention. It is to be understood that I do not limit myself to the showing made by the said description as I may adopt variant forms of my invention within the scope of the claims.

In the drawing, the figure is a perspective view of a brake mechanism embodying my invention and shown applied to the brake drum of the front right hand wheel of an automobile. Portions of the spokes of the wheel are shown and also a part of the front axle.

Users and designers of the four-wheel brakes have found a very dangerous condition may arise if the brake mechanism is such that one of the front wheels is locked when the brakes are applied. When this happens the car tends to leave the road if it does not turn over. Designers therefore have found it necessary to very carefully proportion the amount of braking pressure so that the front wheels are not subjected to the braking effect which is desirable for the rear wheels. Some designers proportion the braking effort in such a way that 40% is applied to the front wheels and 60% to the rear wheels. It is also necessary to equalize the pressure on each of the front wheels since a greater pressure on one wheel than on the other causes the car to swerve to one side.

In terms of broad inclusion the device of my invention comprises means interposed in the brake mechanism for preventing the application to the brake band of a force sufficient to lock the wheel. My device insures that no matter what pressure is applied to the front wheels, that pressure will always be less than that required to lock the wheels.

Means for adjusting the amount of maximum stress applicable to the brake band is also provided so that both of the front wheels may be equalized in the amount of braking force applied.

A well known form of brake mechanism applicable to a brake drum fixed for rotation on the front wheels of a motor vehicle comprises a brake band 2 surrounding the drum backing plate 3 and prevented from rotary movement on the plate by the strap 4 interlocking with the arm 6.

A boss 7 on one end of the brake band is connected by the rod 8 to the curved link 9 pivotally mounted on the boss 11 arranged on the other end of the brake band. Movement of the lever 9 therefore tends to draw the ends of the brake band together to set the brake or to separate the ends of the brake band to release the brake.

The end of the curved lever 9 is connected by the link 12 with the arm 13 extending from the block 14 pivotally mounted in the horizontal axis 16 on the backing plate 3. The backing plate is provided with the bosses 17 for pivotal mounting on the front axle 18 in the vertical axis 19; and pivotally mounted in the block 14 for movement about the same vertical axis, is the shaft 21, the opposite end of which is journaled in the bearing block 22 carried by the axle 18. The arrangement and provision of parts is such that the vertical axis 19 intercepts the horizontal axis 16 about which the shaft 21 oscillates.

Fixed to the shaft 21 is the arm 23 having the eye 24 at its outer end. An actuating rod 26 suitably connected to any convenient lever adjacent the hand of the driver of the car or to a conveniently placed pedal extends thru the eye 24 and terminates in a threaded end upon which the adjusting nut 27 may be threaded. Between the adjusting nut and the eye a spring 28 is interposed and tension of the spring is adjusted by movement of the nut 27 which is retained in the adjusted position by means of the cotter pin 29. Preferably also a flange 31 is provided on the rod 26 against which the eye 24 is resiliently held.

The rod 26 is moved in the direction of the arrow to apply the brake and its movement is transmitted to the arm 23 thru the spring 28. It is obvious then that the amount of stress which can be applied to the arm 23 by the rod 26 may be expressed in terms of the resistance of the spring 28 to compression and this resistance to compression may be varied by means of the adjusting nut 27. Movement of the arm 23 effects a rotary movement or oscillation of the shaft 21 which because of the arrangement of parts is transmitted to the arm 13 irrespective of the position of the wheel and brake drum, and thru the link 12 and arm 9 to the brake band. By properly proportioning the size and resistance to compression of the spring 28, the required or desired braking force may be transmitted to the lever 9 and this is so proportioned that it never can be sufficient to cause the brake band to seize the drum and lock the wheel. Because of the closeness to which the spring 28 may be adjusted, it is entirely practicable to secure substantial uniformity in the braking force required for each of the front wheels, so that any inequality in the amount of pressure applied to the brake drums of the two front wheels is avoided.

I claim:

1. A brake mechanism including a brake drum backing plate, a lever arm movably mounted on said plate outside the drum and the movement of which operates the brake mechanism, a shaft fixed for movement with said arm, an arm fixed to said shaft, a rod for moving said arm, and means interposed between the rod and arm for limiting the stress applicable to said arm by the rod.

2. A brake mechanism including a brake drum backing plate, a lever arm movably mounted on said plate outside the drum and the movement of which operates the brake mechanism, a shaft fixed for movement with said arm, an arm fixed to said shaft, a rod for moving said arm, a spring interposed between the rod and arm for limiting the stress applicable to said arm by the rod, and means for adjusting the tension of the spring.

3. A brake mechanism including a brake drum backing plate, a lever arm movably mounted on said plate outside the drum and the movement of which operates the brake mechanism, a shaft fixed for movement with said arm, an arm fixed to said shaft and having an opening therein, an actuating rod projecting thru said opening, a spring interposed between the projecting end of the rod and the arm, and means for adjusting the tension of the spring.

In testimony whereof, I have hereunto set my hand.

CHARLES E. STARR.